United States Patent
Cabral Herrera

(10) Patent No.: US 10,422,163 B1
(45) Date of Patent: Sep. 24, 2019

(54) ELECTRONIC SENSOR AND KEY OPERATED LOCK

(71) Applicant: Roberto Abelardo Cabral Herrera, Los Angeles, CA (US)

(72) Inventor: Roberto Abelardo Cabral Herrera, Los Angeles, CA (US)

( * ) Notice: Subject to any disclaimer, the term of this patent is extended or adjusted under 35 U.S.C. 154(b) by 0 days.

(21) Appl. No.: 15/726,202

(22) Filed: Oct. 5, 2017

Related U.S. Application Data

(63) Continuation-in-part of application No. 29/617,400, filed on Sep. 13, 2017, and a continuation-in-part of application No. 15/380,868, filed on Dec. 15, 2016, now Pat. No. 9,784,016.

(51) Int. Cl.
| | | |
|---|---|---|
| *E05B 47/00* | (2006.01) | |
| *E05B 49/00* | (2006.01) | |
| *G07C 9/00* | (2006.01) | |
| *E05B 67/22* | (2006.01) | |
| *G06K 9/00* | (2006.01) | |
| *E05B 35/00* | (2006.01) | |

(52) U.S. Cl.
CPC ............ *E05B 49/008* (2013.01); *E05B 67/22* (2013.01); *G06K 9/00087* (2013.01); *G07C 9/00563* (2013.01); *E05B 2035/009* (2013.01); *E05B 2047/0084* (2013.01)

(58) Field of Classification Search
CPC ...... G07C 2009/00095; G07C 9/00087; E05B 67/22; E05B 2047/0084; E05B 2047/002
USPC ...... 70/25, 38 A, 38 B, 279.1, 280, 284, 285
See application file for complete search history.

(56) References Cited

U.S. PATENT DOCUMENTS

| | | | | |
|---|---|---|---|---|
| 6,046,558 A | * | 4/2000 | Larson | ...................... G07C 1/32 318/280 |
| 6,047,575 A | * | 4/2000 | Larson | ................ E05B 47/0012 250/231.14 |
| 6,442,983 B1 | * | 9/2002 | Thomas | .............. E05B 47/0012 70/278.1 |
| 7,948,359 B2 | * | 5/2011 | Marcelle | ............ G07C 9/00182 340/5.64 |
| 8,225,629 B2 | * | 7/2012 | Zuraski | .................. E05B 67/003 292/DIG. 37 |
| 8,850,858 B2 | * | 10/2014 | Nave | ........................ E05B 67/22 70/21 |
| 9,109,379 B1 | * | 8/2015 | Ranchod | ................. E05B 67/00 |
| 9,495,820 B1 | * | 11/2016 | Li | ........................... E05B 67/00 |
| 9,556,651 B1 | * | 1/2017 | Cabral Herrera | ... E05B 47/0012 |
| 9,784,016 B1 | * | 10/2017 | Cabral Herrera | ... E05B 47/0012 |
| 2004/0255623 A1 | * | 12/2004 | Sun | ......................... E05B 67/22 70/38 A |
| 2007/0096870 A1 | * | 5/2007 | Fisher | ................. E05B 19/0005 340/5.53 |

(Continued)

*Primary Examiner* — Suzanne L Barrett
(74) *Attorney, Agent, or Firm* — Plager Schack LLP; Mark H. Plager; Alexis J. Saenz

(57) ABSTRACT

An electronic sensor and key operated lock is disclosed which provides users with the option to use at least one of a manually operated mechanism or for example a biometric sensor to unlock the lock. The lock integrates both the manually operated mechanism and a biometric sensor into one device. The manually operated mechanism and a biometric sensor are coupled to a common toggle switch so that operation of at least one of the manually operated mechanism and the biometric sensor moves the toggle switch and a shackle from locked and unlocked positions.

20 Claims, 11 Drawing Sheets

(56) References Cited

U.S. PATENT DOCUMENTS

| | | | | |
|---|---|---|---|---|
| 2007/0126551 A1* | 6/2007 | Slevin | E05B 67/00 | |
| | | | | 340/5.53 |
| 2010/0083713 A1* | 4/2010 | Woodling | E05B 47/0603 | |
| | | | | 70/22 |
| 2012/0011902 A1* | 1/2012 | Meekma | E05B 47/0012 | |
| | | | | 70/25 |
| 2013/0055773 A1* | 3/2013 | Li | E05B 47/06 | |
| | | | | 70/278.1 |
| 2015/0292244 A1* | 10/2015 | Beatty | E05B 47/0012 | |
| | | | | 70/20 |
| 2017/0009491 A1* | 1/2017 | Nguyen | E05B 67/10 | |

* cited by examiner

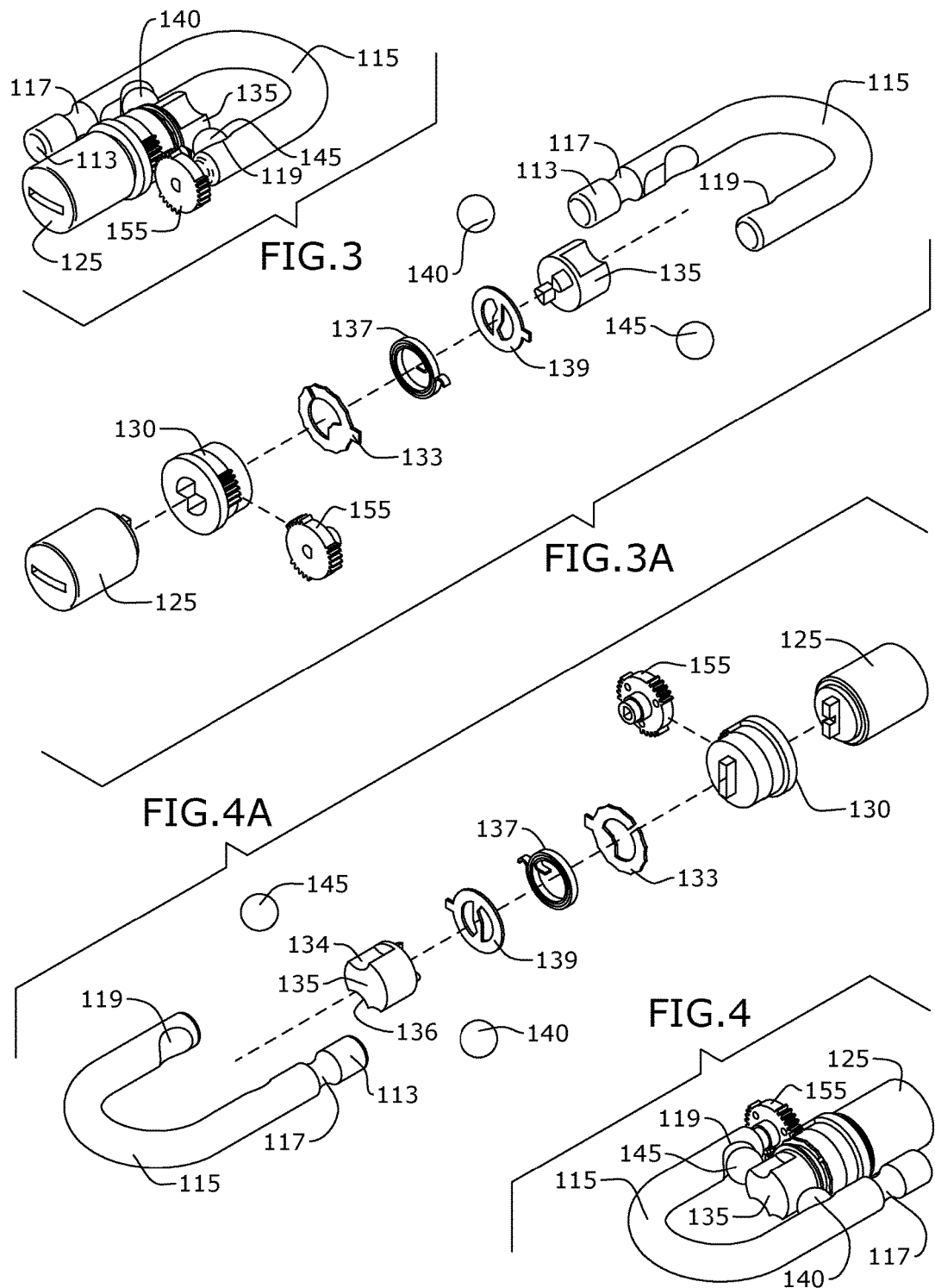

ELECTRONIC SENSOR AND KEY OPERATED LOCK

CROSS-REFERENCE TO RELATED APPLICATIONS

This application claims benefit under 35 U.S.C. § 119(e) to U.S. Pat. No. 9,556,651 issued on Jan. 31, 2017, to Non-provisional patent application U.S. Ser. No. 15/380,868 filed on Dec. 15, 2016, and to U.S. Ser. No. 29/617,400 filed Sep. 13, 2017, the entire contents of which are herein incorporated by reference.

BACKGROUND

The embodiments herein relate generally to security devices and more particularly, to an electronic sensor and key operated lock.

Prior art locks typically provide only a single means to unlock. Conventional locks, such as padlocks use a physical key to open them. Some newer locks may use an electronic mechanism to open. However each of these approaches is distinct in the marketplace. The two approaches are generally incompatible as they use different means to unlock the securing mechanism. Thus what occurs is that one who uses a key based lock and forgets or loses their key generally must destroy the lock to gain access to the secured article(s). For those that use electronic based locks, and in particular biometric based systems, a common occurrence and flaw in the device is that it loses power or otherwise fails electronically leaving the device inoperable to open and once again generally leaves the owner little choice but to destroy the lock.

As can be seen, there is a need for a lock which provides compatibility with manual and electronic mechanisms to open, providing the user a failsafe option in case one mode of operation is unavailable.

SUMMARY

In one aspect of the subject technology, a lock comprises a housing; a biometric scanner coupled to the housing; a circuit controller connected to the biometric scanner; a power source connected to the circuit controller and the biometric scanner; a motor connected to the circuit controller and the power source, the motor configured to operate in response to a signal from the circuit controller based on input into the biometric scanner; a tumbler coupled to the housing including a keyhole for receipt of a key, wherein the tumbler is movable by operation of the key; a clutch gear coupled to the tumbler and the motor wherein the clutch gear is configured to engage: the motor in response to the signal from the circuit controller and/or the tumbler in response to operation of the key in the keyhole; and a shackle coupled to the housing and the clutch gear, the shackle movable from a locked and unlocked position by engagement of the clutch gear with the tumbler or engagement of the clutch gear with the motor.

In another aspect, an electronic and key operated lock comprises a lock housing; an electronic sensor coupled to the lock housing; a power source connected to the electronic sensor; a motor connected to the electronic sensor and the power source, the motor configured to operate in response to a signal from the electronic sensor; a tumbler including a manually operated mechanism, wherein the tumbler is movable by operation of at least the manually operated mechanism; a clutch gear coupled to the tumbler and the motor wherein the clutch gear is configured to engage: the motor in response to the signal from the electronic sensor, and/or the tumbler in response to operation of the key in the keyhole; and a shackle coupled to the lock housing and the clutch gear, the shackle movable from a locked and unlocked position by engagement of the clutch gear with the tumbler or engagement of the clutch gear with the motor.

In still yet another aspect, a lock comprises a lock housing; a biometric scanner integrated into the lock housing; a circuit controller connected to the biometric scanner; a power source connected to the circuit controller and the biometric scanner; a motor inside the lock housing, connected to the circuit controller and the power source; a tumbler inside the lock housing, the tumbler including a keyhole for receipt of a key, wherein the tumbler is movable by operation of the key; and a shackle coupled to the lock housing, the shackle movable from a locked state and an unlocked state by operation of: the circuit controller receiving an authorized biometric input and in response to receiving the authorized biometric input, driving the motor to move the shackle to an unlocked position, or the tumbler being engaged by the key to move the shackle to the unlocked position.

In still yet another aspect, a lock comprises a housing; a biometric scanner coupled to the housing; a circuit controller connected to the biometric scanner; a power source connected to the circuit controller and the biometric scanner; a motor connected to the circuit controller and the power source, the motor configured to operate in response to a signal from the circuit controller based on input into the biometric scanner; a tumbler coupled to the housing including a keyhole for receipt of a key, wherein the tumbler is movable by operation of the key; a rotatable toggle switch coupled to the tumbler and the motor wherein the toggle switch is configured to: rotate into a first position to engage the motor in response to the signal from the circuit controller and/or rotate into a second position to engage the tumbler in response to operation of the key in the keyhole; and a shackle coupled to the housing and the toggle switch, the shackle movable from a locked and unlocked position by engagement of the toggle switch with the tumbler or engagement of the toggle switch with the motor.

In still yet another aspect, an electronic and combination based lock comprises a lock housing; an electronic sensor coupled to the lock housing; power source connected to the electronic sensor; a motor connected to the electronic sensor and the power source, the motor configured to operate in response to a signal from the electronic sensor; a tumbler including a manually operated mechanism, wherein the tumbler is movable by operation of at least the manually operated mechanism; a rotatable toggle switch coupled to the tumbler and the motor wherein the toggle switch is configured to: engage the motor in response to the signal from the electronic sensor, and/or engage the tumbler in response to operation of the manually operated mechanism; and a shackle coupled to the lock housing and the rotatable toggle switch, the shackle movable from a locked and unlocked position by engagement of the rotatable toggle switch into a first rotated position with the tumbler or engagement of the rotatable toggle switch into a second rotated position by operation of the motor.

BRIEF DESCRIPTION OF THE FIGURES

The detailed description of some embodiments of the invention is made below with reference to the accompanying figures, wherein like numerals represent corresponding parts of the figures.

FIG. 3 is a front perspective view of a keyed tumbler and shackle assembly of FIG. 1A.

FIG. 3A is an exploded view of the assembly of FIG. 3.

FIG. 4 is a rear perspective view of a keyed tumbler and shackle assembly of FIG. 1A.

FIG. 4A is an exploded view of the assembly of FIG. 4.

DETAILED DESCRIPTION OF CERTAIN EMBODIMENTS

Referring to the Figures in general, embodiments of the disclosed invention provide an electronic sensor and key operated lock. The lock integrates both a manually operated mechanism and an electronic sensor into one device. The lock provides users with the option to use at least one of the manually operated mechanism and the electronic sensor to unlock the lock. In an exemplary embodiment, a locking element is moved by a toggle switch that is connected in common to the manually operated mechanism and the electronic sensor. In one aspect, users may rely primarily on the electronic sensor and in the event the electronic sensor fails, the user may still have the ability to open the lock by the manual mode of operation.

Figure 1:
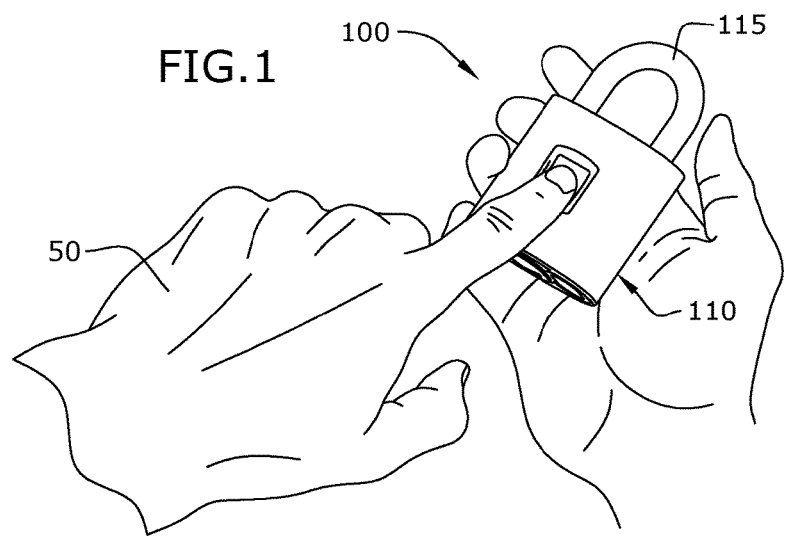
FIG. 1 is a front perspective view of an electronic sensor and key operated lock in use according to an embodiment of the subject technology.

Referring now to FIG. 1, a lock 100 is shown in operation according to an exemplary embodiment of the subject technology. In an exemplary embodiment, the lock 100 is a padlock. The lock 100 includes a lock housing 110 and a shackle 115, which in some embodiments may be a "U"-shaped piece of metal. The lock 100 is shown in a locked state and operated by a user 50 to be unlocked by use of elements as described in the following.

Figures 2, 2A:
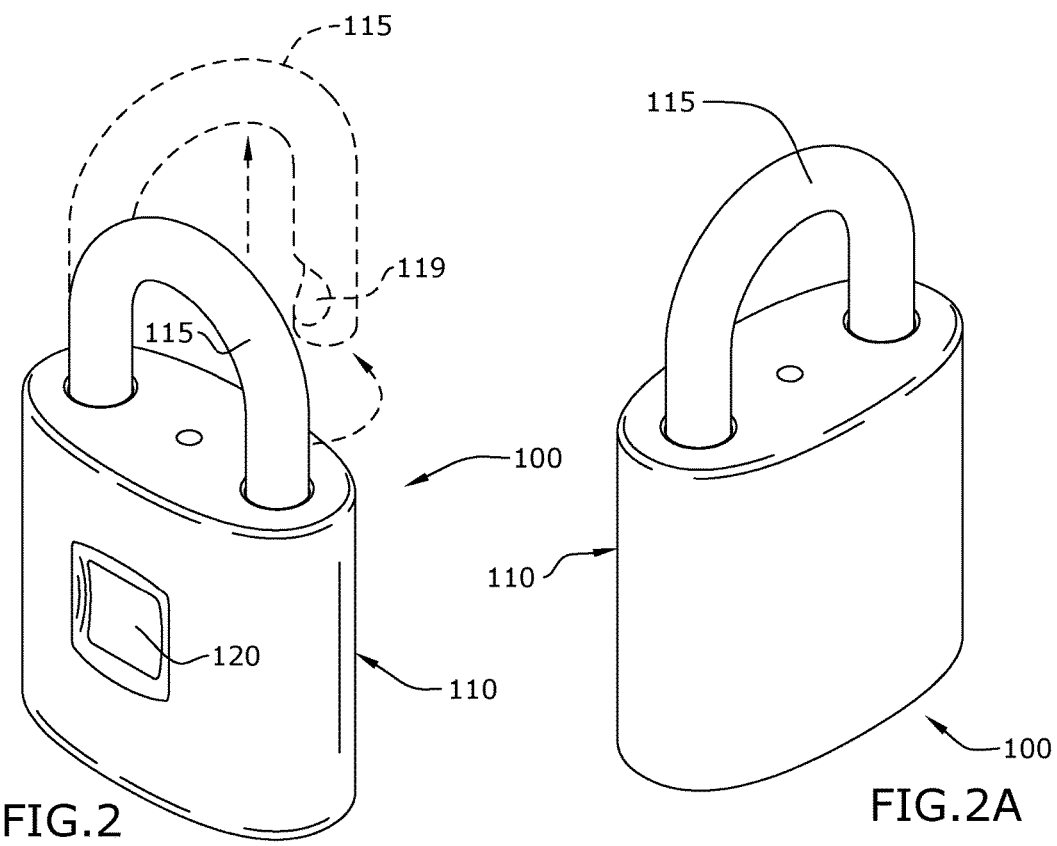
FIG. 2 is a front perspective view of the lock of FIG. 1 showing open and closed positions of a shackle.
FIG. 2A is a perspective rear view of the lock of FIG. 1.
Figure 1A:
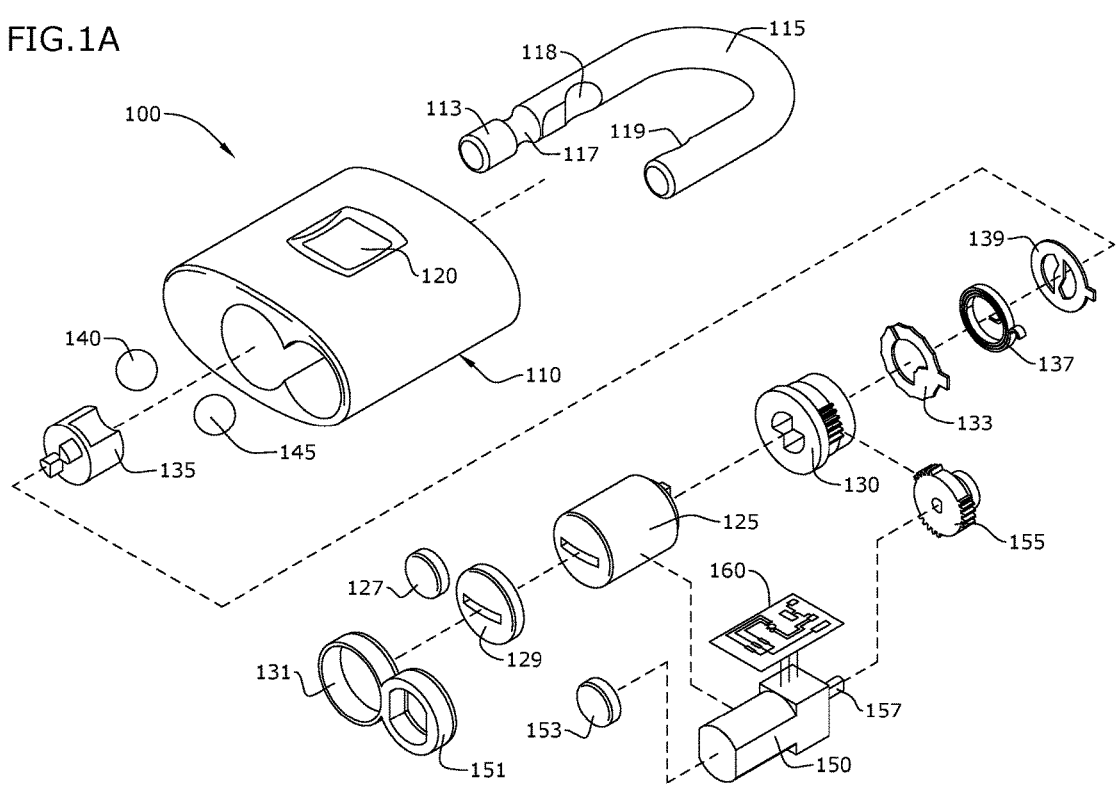
FIG. 1A is an exploded view of the lock of FIG. 1.
Figure 5:
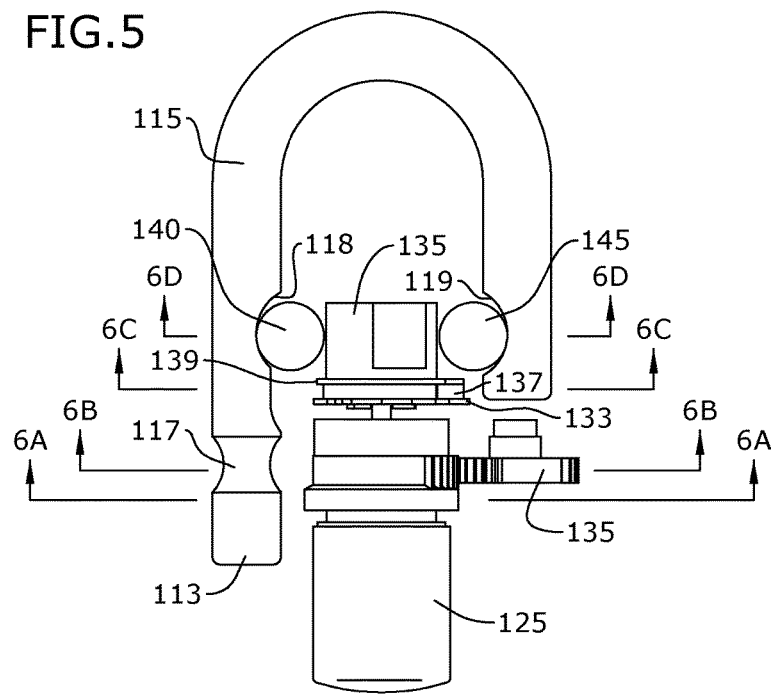
FIG. 5 is a top view of the assembly of FIG. 3.
Figure 6A:
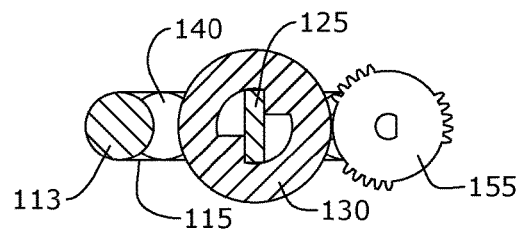
FIG. 6A is a cross-sectional view taken along the line 6A-6A of FIG. 5.
Figure 6C:
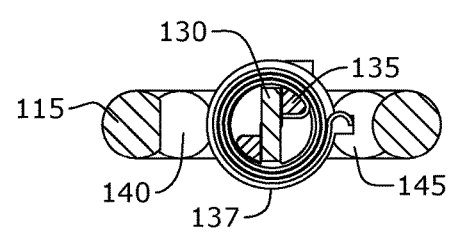
FIG. 6C is a cross-sectional view taken along the line 6C-6C of FIG. 5.
Figure 6B:
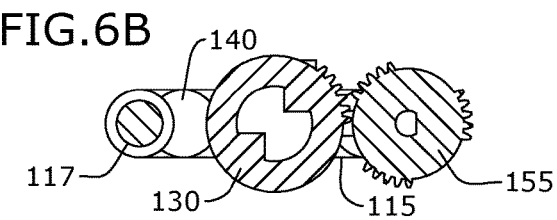
FIG. 6B is a cross-sectional view taken along the line 6B-6B of FIG. 5.
Figure 6D:
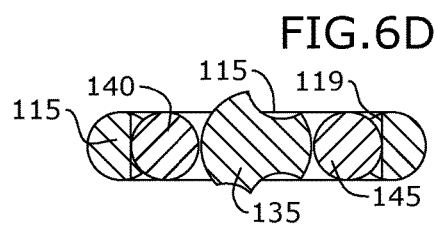
FIG. 6D is a cross-sectional view taken along the line 6D-6D of FIG. 5.
Figure 7:
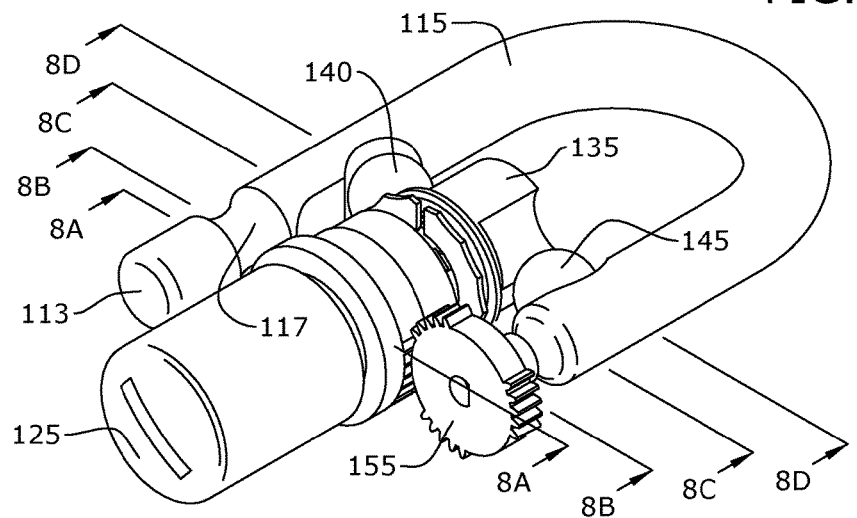
FIG. 7 is a front perspective view of a keyed tumbler and shackle assembly in manual key operation being opened from a locked position to an intermediate state between locked and unlocked positions.
Figure 8A:
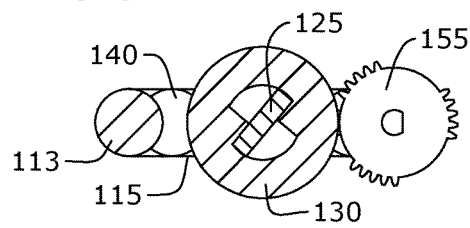
FIG. 8A is a cross-sectional view taken along the line 8A-8A of FIG. 7.
Figure 8C:
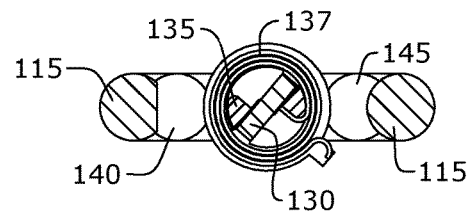
FIG. 8C is a cross-sectional view taken along the line 8C-8C of FIG. 7.
Figure 8B:
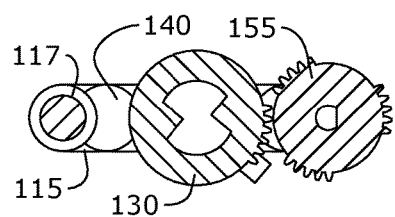
FIG. 8B is a cross-sectional view taken along the line 8B-8B of FIG. 7.
Figure 8D:
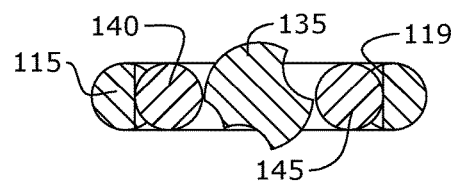
FIG. 8D is a cross-sectional view taken along the line 8D-8D of FIG. 7.
Figure 9:
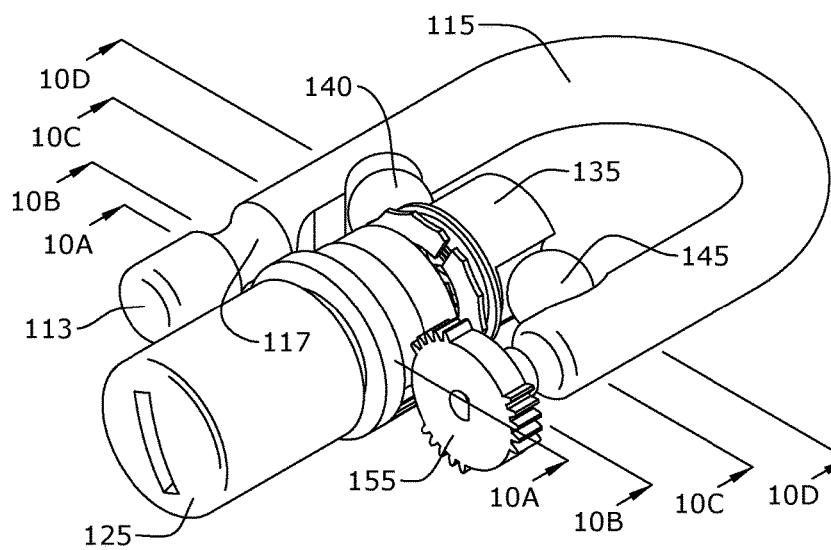
FIG. 9 is a front perspective view of a keyed tumbler and shackle assembly in manual key operation in an unlocked position.
Figure 10A:
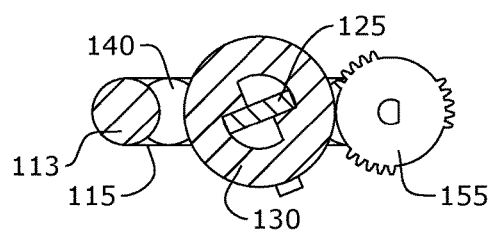
FIG. 10A is a cross-sectional view taken along the line 10A-10A of FIG. 9.
Figure 10C:
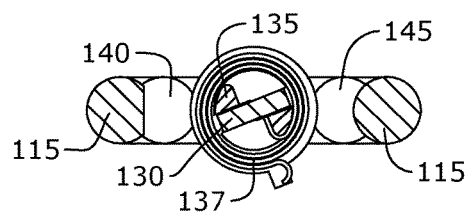
FIG. 10C is a cross-sectional view taken along the line 10C-10C of FIG. 9.
Figure 10B:
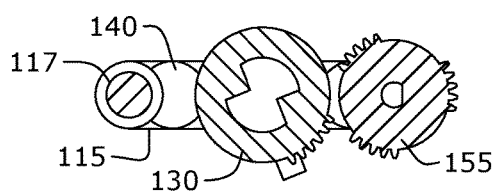
FIG. 10B is a cross-sectional view taken along the line 10B-10B of FIG. 9.
Figure 10D:
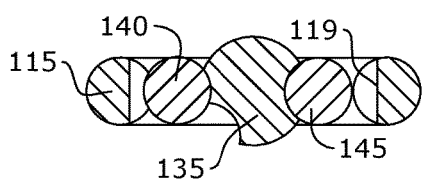
FIG. 10D is a cross-sectional view taken along the line 10D-10D of FIG. 9.
Figure 11:
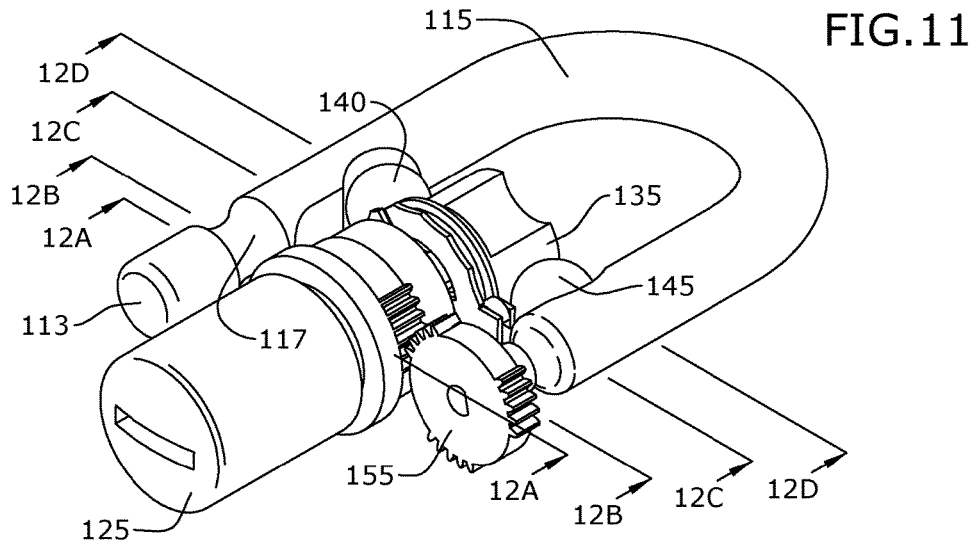
FIG. 11 is a front perspective view of a tumbler and shackle assembly under biometric sensory operation in a locked position.
Figure 12A:
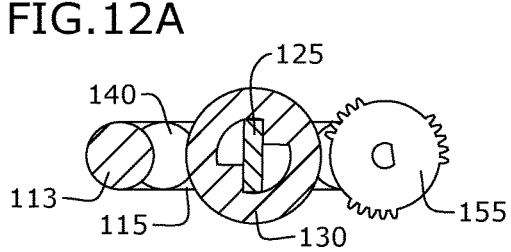
FIG. 12A is a cross-sectional view taken along the line 12A-12A of FIG. 11.
Figure 12C:
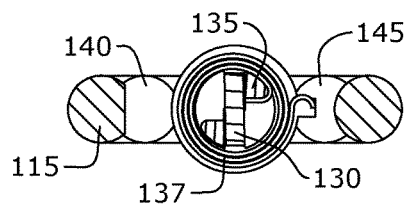
FIG. 12C is a cross-sectional view taken along the line 12C-12C of FIG. 11.
Figure 12B:
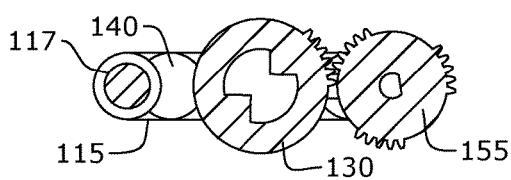
FIG. 12B is a cross-sectional view taken along the line 12B-12B of FIG. 11.
Figure 12D:
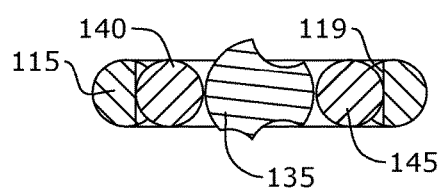
FIG. 12D is a cross-sectional view taken along the line 12D-12D of FIG. 11.
Figure 13:
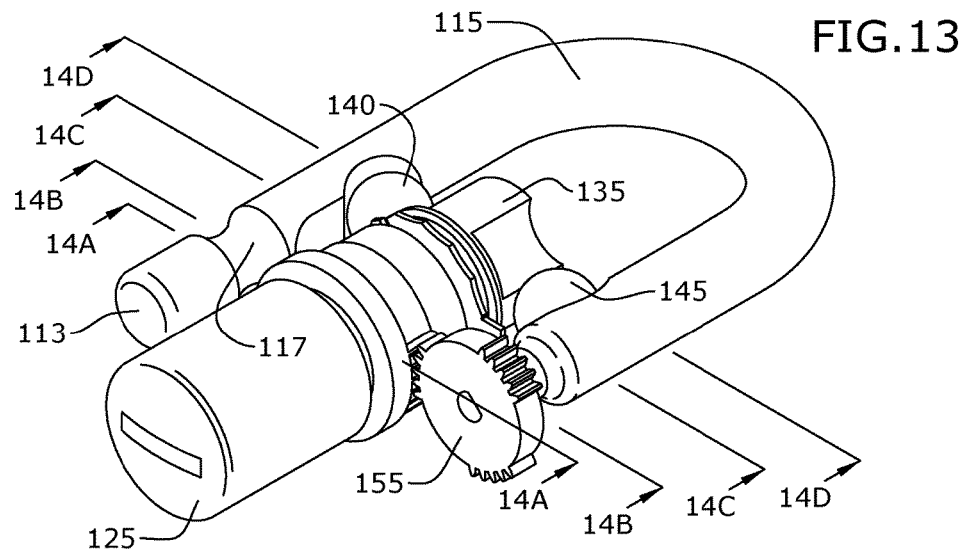
FIG. 13 is a front perspective view of the tumbler and shackle assembly of FIG. 11 intermediate a locked position and an unlocked position.
Figure 14A:
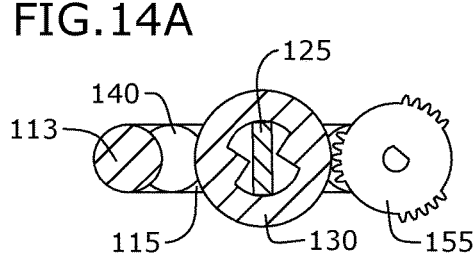
FIG. 14A is a cross-sectional view taken along the line 14A-14A of FIG. 13.
Figure 14C:
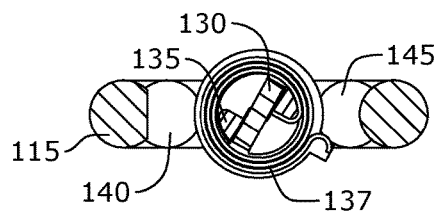
FIG. 14C is a cross-sectional view taken along the line 14C-14C of FIG. 13.
Figure 14B:
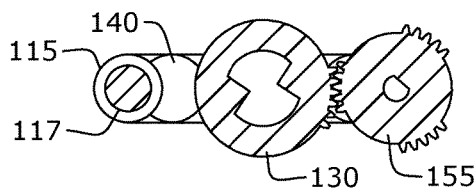
FIG. 14B is a cross-sectional view taken along the line 14B-14B of FIG. 13.
Figure 14D:
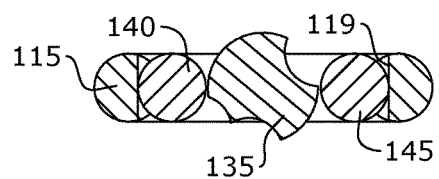
FIG. 14D is a cross-sectional view taken along the line 14D-14D of FIG. 13.
Figure 15:
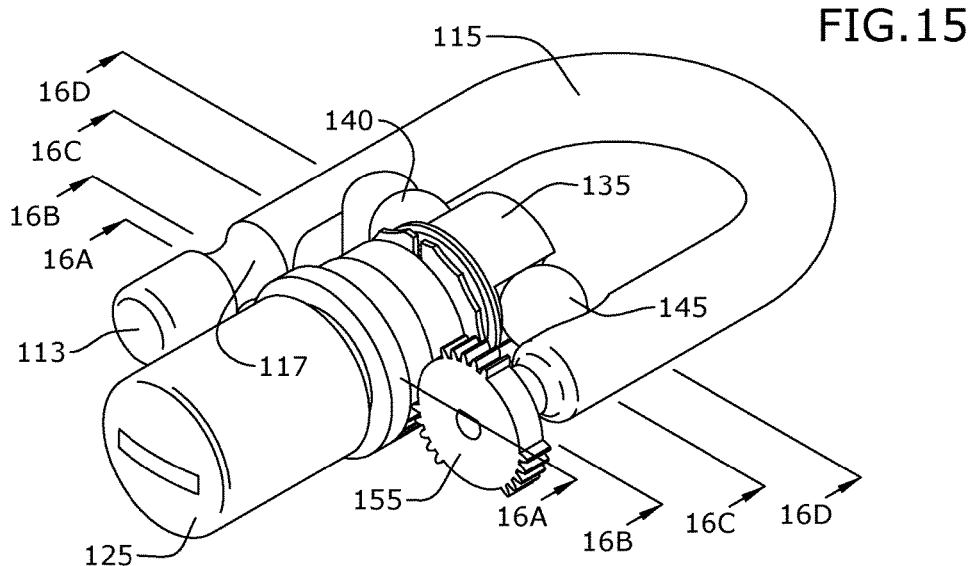
FIG. 15 is a front perspective view of the tumbler and shackle assembly of FIG. 11 in an unlocked position.
Figure 16A:
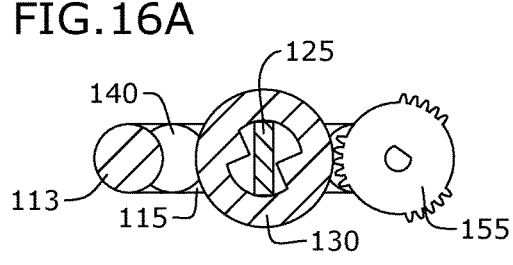
FIG. 16A is a cross-sectional view taken along the line 16A-16A of FIG. 15.
Figure 16C:
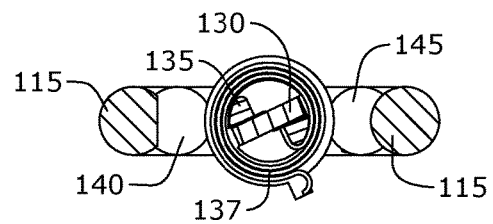
FIG. 16C is a cross-sectional view taken along the line 16C-16C of FIG. 15.
Figure 16B:
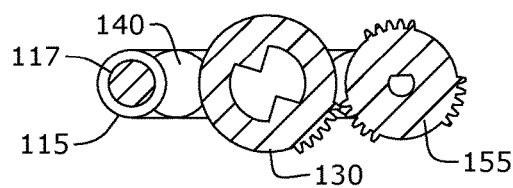
FIG. 16B is a cross-sectional view taken along the line 16B-16B of FIG. 15.
Figure 16D:
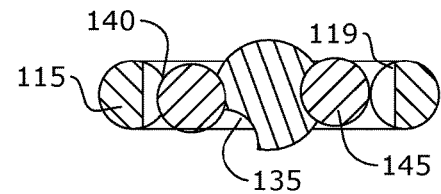
FIG. 16D is a cross-sectional view taken along the line 16D-16D of FIG. 15.
Figure 17:
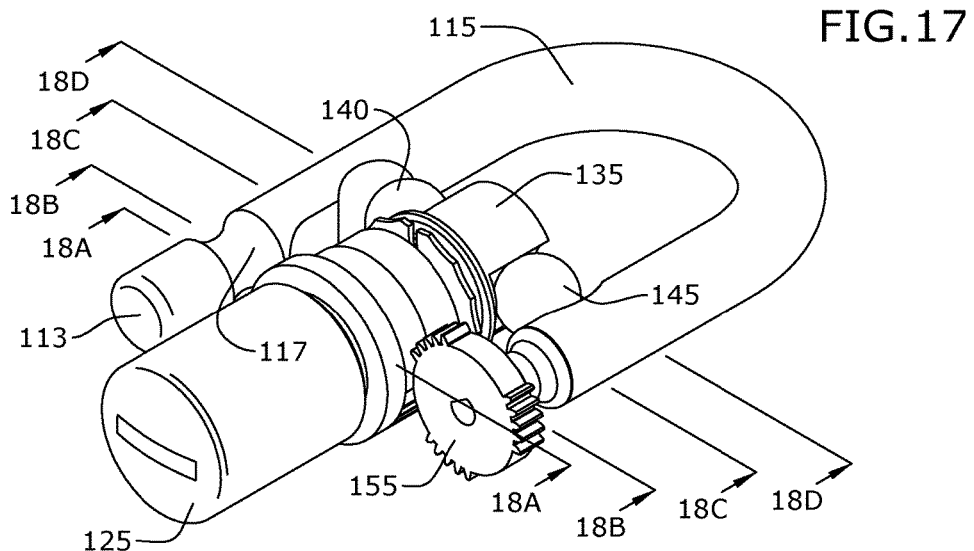
FIG. 17 is a front perspective view of the tumbler and shackle assembly of FIG. 15 with a clutch gear disengaged from a second gear.
Figure 18A:
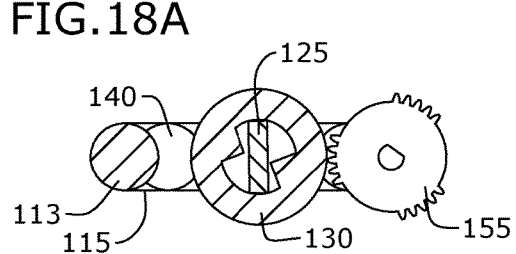
FIG. 18A is a cross-sectional view taken along the line 18A-18A of FIG. 17.
Figure 18C:
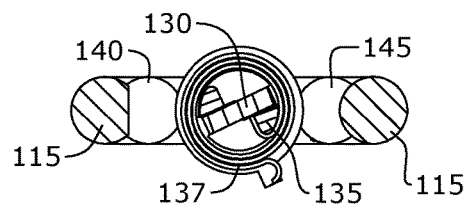
FIG. 18C is a cross-sectional view taken along the line 18C-18C of FIG. 17.
Figure 18B:
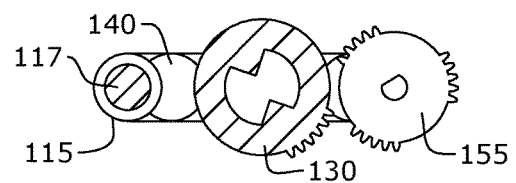
FIG. 18B is a cross-sectional view taken along the line 18B-18B of FIG. 17.
Figure 18D:
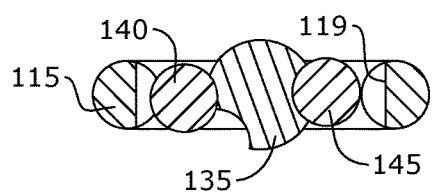
FIG. 18D is a cross-sectional view taken along the line 18D-18D of FIG. 17.
Figure 19:
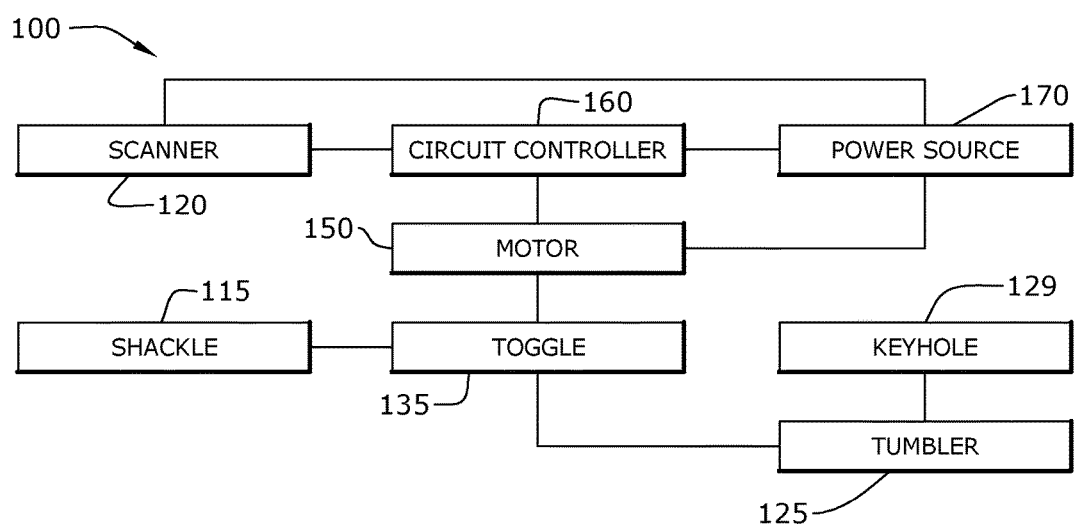
FIG. 19 is a block diagram showing electrical connections in a biometric sensor and key operated lock according to an embodiment of the subject technology.

Referring now to FIG. 1A, the lock 100 is shown in exploded view with internal elements shown in conjunction with the external elements. In general, operation of the lock is provided by one of two modes: an electronic key mode and a manual key mode. The shackle 115 is the securing mechanism common to both modes. In addition, a toggle switch 135 is connected to the shackle 115 and is configured to operate or be movable by both the electronic key mode and the manual key mode. In some embodiments, the shackle 115 may include a stem recess 113 adjacent to a pivot stem portion 117 on one end and a recess 119 on an opposite locking end. Ball bearings 140 and 145 may be received in recesses 118 and 119 respectively to detain the shackle 115 in the locked state. Referring temporarily to FIGS. 2 and 2A in conjunction with FIG. 1A, the shackle 115 is movable into and out of a locked state by the electronic key mode via for example an electronic sensor 120. In the locked state, the shackle's recess 119 is positioned inside the housing 110. In the unlocked state the shackle 115 may be free to move upward so that the recess 119 is outside of the housing 110 and the shackle 115 may pivot around the axis of the stem portion 117. As will be understood, the shackle 115 may operate in the same manner in the manual key mode.

In an exemplary embodiment, the toggle switch 135 is configured to interface with the ball bearings 140 and 145 so that rotation of the toggle switch 135 moves the ball bearings 140 and 145 in and out of the recesses 118 and 119 as described in further detail below. In some embodiments, the toggle switch 135 is primarily connected to the manual key mode elements and secondarily to the electronic key mode elements, however it will be understood that the configuration may be reversed to the same effect. For sake of illustration, the connection of the toggle switch 135 will be described first with respect to the manual key mode elements.

Manual Key Mode

Still referring to FIG. 1A, the manual key mode includes a tumbler 125. In an exemplary embodiment, the tumbler 125 may be a pin type tumbler including a keyhole 129 for receipt of a key (not shown). The internal operation of the tumbler 125 may be operated as is known in the art. Some embodiments may include a retainer system 131; 151 at the interface of the keyhole 129 and the housing 110 to keep the motor 150 from spinning inside the lock. The element 151 accepts motor 150 while element 131 secures the retaining piece to tumbler 125 thereby keeping the motor 150 from turning inside the lock as it moves. In an exemplary embodiment, the toggle switch 135 is keyed to the tumbler 125 by a clutch gear 130. Operation of the tumbler 125 may induce the clutch gear 130 to rotate which in response rotates the toggle switch 135. In some embodiments, the clutch gear 130 is in a default position to engage the toggle switch 135 by operation of the tumbler 125. A retainer 133 holds a clock-spring 137 in place between the clutch gear 130 and toggle switch 135. When a key is inserted in the tumbler 125, the clutch gear 130 rotates and engages the toggle switch 135. The toggle switch 135 rotates and releases the shackle 115 from the locked state. The clock spring 137 may be configured to return the clutch gear 130 to a starting position in response to the key being removed from the tumbler 125. A limiter 139 limits movement of the toggle switch 135 so that the spring 137 does not move the toggle switch 135 beyond a vertical position. The spring 137 biases the toggle switch 135 in the counter-clockwise direction as viewed on the drawing. As will be appreciated, in some embodiments, the clutch gear 130 also serves as a common element engaging/disengaging with the motor 150 to activate when needed operation of the electronic key mode as described herein.

Electronic Key Mode

The electronic key mode includes an electronic sensor 120 on an exterior of the housing 110. Some embodiments may include a scanner button 127 to activate operation of the electronic sensor 120. The electronic sensor 120 may be for example a biometric sensor. In an exemplary embodiment, the electronic sensor 120 is a fingerprint scanner configured to read fingerprints. The electronic sensor 120 may be connected to a circuit board controller 160 which may be positioned behind the electronic sensor 120 within the interior of the housing 110. For sake of illustration, a power source 170 (FIG. 12) is omitted from view in FIG. 1A. The circuit board controller 160 may include memory and a processor (not shown) configured to store authorized fingerprint records and recognize fingerprints detected by the electronic sensor 120. In some embodiments, the circuit board 160 may include a programming button 153 enabled when the lock 100 is unlocked. The button 127 may be operated to trigger the "add" button 153 to allow for example biometric programming of the electronic sensor 120. This way, the lock 100 can only be programmed in the unlocked position when it is clear that access to the lock 100 is authorized. The circuit board 160 may also be configured to, in response to receiving an authorized fingerprint scan from the electronic sensor 120, send a signal to a motor 150 (in the housing 110) to rotate a shaft 157. The shaft 157 may be coupled to a gear 155. The gear 155 may in some embodiments be keyed to splines on the clutch gear 130. The splined portion of the clutch gear 130 may only catch onto and move the clutch gear 130 during the electronic key mode. In operation, in response to the user 50 (FIG. 1) providing an authenticated input to the electronic sensor 120, the motor 150 induces the gear 155 to turn the clutch gear 130 which in turn operates the toggle switch 135 to unlock the shackle 115 as described above.

Locked State

Referring now to FIGS. 3, 3A, 4, 4A, and 5, the above described elements of the keyed tumbler and shackle assembly sans the housing 110 are shown in a locked state. In an exemplary embodiment, the ball bearings 140 and 145 operate as detents retaining the recesses 118 and 119 and consequently the shackle 115 into the locked position. In an exemplary embodiment, the toggle switch 135 may be cylindrical and include pockets 134 and 136 on its exterior surface configured to receive and carry the ball bearings 140 and 145. However as shown in these Figures, in the locked state, the ball bearings 140 and 145 may be in contact with the cylindrical exterior surface and out of alignment with the pockets 134 and 136. FIGS. 6A-6D show the cross-sections along the longitudinal axis of the shackle and tumbler assembly in the locked state.

FIGS. 7, 8A-8D, 9 and 10A-10 show the above described elements of the keyed tumbler and shackle assembly sans the housing 110 via manual key operation. The elements are being turned from a locked position to an unlocked position. FIGS. 7 and 8A-8D show a locked state. FIGS. 9 and 10A-10D show the elements in the unlocked state. As will be appreciated, the manual mode mechanism(s) and electronic mode mechanism(s) may operate independently of one another to unlock the shackle 115. For example, the gear 155 may retain its position without moving while the clutch gear 130 rotates. As the clutch gear 130 turns the toggle switch 135, the ball bearings 140 and 145 may be in alignment with the pockets 134 and 136, carried and rotated out of the recesses 118 and 119, thus freeing the shackle 115 to move up and rotate along the axis of the end portion 117.

FIGS. 11, 12A-12D, 13, 14A-14D, 15, 16A-16D, 17, and 18A-18D show the above described elements of the keyed tumbler and shackle assembly sans the housing via electronic key operation. FIGS. 11 and 12A-12D show a locked state. In this mode, the tumbler 125 may not move/rotate and thus the keyhole 129 is not shown as rotating while the gear 155 rotates into contact with the clutch gear 130. The clutch gear 130 in turn rotates the toggle switch 135 (FIGS. 13, 14A-14D, 15, and 16A-16D) so that the ball bearings 140 and 145 may be in alignment with the pockets 134 and 136, carried and rotated out of the recesses 118 and 119, thus freeing the shackle 115 to move up and rotate along the axis of the end portion 117. FIGS. 17 and 18A-18D show the relative position of elements as the clutch gear 130 disengages from the gear 155.

FIG. 12 shows a block diagram of connections among some of the above described non-electronic and electronic elements. As may be appreciated, the toggle switch 135 provides a beneficial link joining manual (non-electronic) and electronic elements to provide a lock 100 that heretofore could use one or the other of manual or electronic mechanisms but generally not both simultaneously.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. For example, while the manually operated mechanism was described in the context of a pin type tumbler, other manual locking mechanisms may be used to the same effect which includes for example combination locks. In addition, while the electronic sensor was described in the context of a fingerprint scanner, other electronic sensors such as RF devices, IR sensors, etc. may trigger authentication/authorization in the circuit board controller thus operating the motor 150 to move the toggle switch 135 to lock/unlock the shackle 115. Furthermore, while the lock 100 was generally described in the context of a padlock using a "U"-shaped shackle, it will be understood that other shackles such as bolts or cables may be used with modifications to the elements holding the shackle in place and the toggle switch being configured to move and release those elements.

What is claimed is:

1. A lock, comprising:
a housing;
a biometric scanner coupled to the housing;
a circuit controller connected to the biometric scanner;
a power source connected to the circuit controller and the biometric scanner;
a motor connected to the circuit controller and the power source, the motor configured to operate in response to a signal from the circuit controller based on input into the biometric scanner;
a tumbler coupled to the housing including a keyhole for receipt of a key, wherein the tumbler is movable by operation of the key;
a rotatable toggle switch coupled to the tumbler and the motor wherein the toggle switch is configured to:
rotate into a first position by engagement of the motor in response to the signal from the circuit controller and/or
rotate into a second position to engage the tumbler in response to operation of the key in the keyhole; and
a shackle coupled to the housing and the toggle switch, the shackle movable from a locked and unlocked position by engagement of the toggle switch with the tumbler or engagement of the toggle switch with the motor.

2. The lock of claim 1, wherein:
the toggle switch includes at least a first pocket on a side wall of the toggle switch, the lock further comprises a first ball bearing positioned between the shackle and the toggle switch side wall, and
in response to a rotation of the toggle switch, the first ball bearing rotates into or out of the first pocket of the toggle switch to move the shackle into the locked or unlocked position.

3. The lock of claim 1, wherein the biometric scanner is a fingerprint scanner.

4. The lock of claim 1, wherein the shackle is a "U"-shaped shackle.

5. The lock of claim 1, wherein the shackle is a bolt.

6. The lock of claim 1, wherein the shackle includes a cable.

7. An electronic and combination based lock, comprising:
a lock housing;
an electronic sensor coupled to the lock housing;
power source connected to the electronic sensor;
a motor connected to the electronic sensor and the power source, the motor configured to operate in response to a signal from the electronic sensor;
a tumbler including a manually operated mechanism, wherein the tumbler is movable by operation of at least the manually operated mechanism;
a rotatable toggle switch coupled to the tumbler and the motor wherein the toggle switch is configured to:
rotate by engagement of the motor in response to the signal from the electronic sensor, and/or
rotate to engage the tumbler in response to operation of the manually operated mechanism; and
a shackle coupled to the lock housing and the rotatable toggle switch, the shackle movable from a locked and unlocked position by engagement of the rotatable toggle switch into a first rotated position with the tumbler or engagement of the rotatable toggle switch into a second rotated position by operation of the motor.

8. The electronic and combination based lock of claim 7, wherein the electronic sensor is a biometric scanner.

9. The electronic and combination based lock of claim 8, wherein the biometric scanner is a fingerprint scanner.

10. The electronic and combination based lock of claim 7, wherein the manually operated mechanism is a combination lock mechanism.

11. A lock, comprising:
a housing;
a biometric scanner coupled to the housing;
a circuit controller connected to the biometric scanner;
a power source connected to the circuit controller and the biometric scanner;
a motor connected to the circuit controller and the power source, the motor configured to operate in response to a signal from the circuit controller based on input into the biometric scanner;
a tumbler coupled to the housing including a keyhole for receipt of a key, wherein the tumbler is movable by operation of the key;
a gear coupled to the tumbler and the motor wherein:
the motor is configured to engage the gear in response to the signal from the circuit controller and/or
the tumbler is configured to engage the gear in response to operation of the key in the keyhole; and
a securing mechanism coupled to the housing and the gear, the securing mechanism movable from a locked and unlocked position by engagement of the tumbler with the gear or engagement of the motor with the gear.

12. The lock of claim 11, further comprising a spring configured to return the gear to a starting position in response to the key being removed from the tumbler.

13. The lock of claim 11, wherein the securing mechanism is a "U"-shaped shackle.

14. The lock of claim 11, wherein the securing mechanism includes a cable.

15. The lock of claim 11, wherein the securing mechanism is a bolt.

16. A lock, comprising:
a biometric scanner;
a circuit controller connected to the biometric scanner;

a power source connected to the circuit controller and the biometric scanner;

a motor connected to the circuit controller and the power source, the motor configured to operate in response to a signal from the circuit controller based on input into the biometric scanner;

a tumbler including a manually operated mechanism, wherein the tumbler is movable by operation of at least the manually operated mechanism;

a switch coupled to the tumbler and the motor, wherein the switch is movable from a first position to a second position by operation of at least one of the motor and the tumbler; and a securing mechanism coupled to the switch, the securing mechanism movable from a locked and unlocked position by operation of the switch.

17. The lock of claim 16, further comprising a spring biasing the switch in a first direction.

18. The lock of claim 16, wherein the securing mechanism is a "U"-shaped shackle.

19. The lock of claim 16, wherein the securing mechanism includes a cable.

20. The lock of claim 16, wherein the securing mechanism is a bolt.

* * * * *